US011467807B2

(12) United States Patent
Migliozzi et al.

(10) Patent No.: US 11,467,807 B2
(45) Date of Patent: Oct. 11, 2022

(54) APPARATUS FOR THE GENERATION OF RANDOM NUMBERS WHICH COMPRISES A MUON DETECTION DEVICE AND A PROCESSING DEVICE CONFIGURED TO PROVIDE RANDOM NUMBERS

(71) Applicant: Istituto Nazionale di Fisica Nucleare, Frascati (IT)

(72) Inventors: Pasquale Migliozzi, Frascati (IT); Carlos Maximiliano Mollo, Frascati (IT)

(73) Assignee: ISTITUTO NAZIONALE DI FISICA NUCLEARE, Frascati (IT)

( * ) Notice: Subject to any disclaimer, the term of this patent is extended or adjusted under 35 U.S.C. 154(b) by 0 days.

(21) Appl. No.: 16/634,550

(22) PCT Filed: Jul. 10, 2018

(86) PCT No.: PCT/IB2018/055055
§ 371 (c)(1),
(2) Date: Jan. 27, 2020

(87) PCT Pub. No.: WO2019/021092
PCT Pub. Date: Jan. 31, 2019

(65) Prior Publication Data
US 2021/0182027 A1 Jun. 17, 2021

(30) Foreign Application Priority Data
Jul. 27, 2017 (IT) ........................ 102017000086031

(51) Int. Cl.
*G06F 7/58* (2006.01)

(52) U.S. Cl.
CPC .................................... *G06F 7/58* (2013.01)

(58) Field of Classification Search
CPC ........................................................ G06F 7/58
See application file for complete search history.

(56) References Cited

U.S. PATENT DOCUMENTS 10,361,844 B2 * 7/2019 Brown .................... G09C 5/00
2010/0195829 A1 8/2010 Blom et al.
2015/0261502 A1 9/2015 Sartor

FOREIGN PATENT DOCUMENTS

EP 2600561 A1 6/2013

OTHER PUBLICATIONS

Written Opinion of International Searching Authority dated Oct. 22, 2018.
International Preliminary Report on Patentability dated Jan. 28, 2020.
International Search Report dated Oct. 22, 2018.

* cited by examiner

*Primary Examiner* — Michael D. Yaary
(74) *Attorney, Agent, or Firm* — Hedman & Costigan, P.C.; James V. Costigan; Kathleen A. Costigan

(57) ABSTRACT

An apparatus for generating random numbers (100) is described, comprising: a detection device (1) sensitive to the pass-through of muons (μ) and suitable to provide a first detection signal ($S_{md}$) representing at least one parameter associated with the pass-through of a single muon; a processing device (2) configured to receive the first detection signal ($S_{md}$) and to generate at least one random number (RN) as a function of a mathematical rule and of said at least one parameter.

8 Claims, 4 Drawing Sheets

APPARATUS FOR THE GENERATION OF RANDOM NUMBERS WHICH COMPRISES A MUON DETECTION DEVICE AND A PROCESSING DEVICE CONFIGURED TO PROVIDE RANDOM NUMBERS

TECHNICAL FIELD

The present invention relates to random number generation.

DESCRIPTION OF PRIOR ART

For the random number generation is known to use sources of entropy external to the computer which generates the sequence of random numbers. For example, a random number is employed to generate the "seed" from which the computer starts its pseudo-random sequence.

Various techniques have been proposed for generating random numbers that are based on the measurement of the decay of radioactive sources, on radio noise, on thermal noise, on acoustic noise, on the measurement of astronomical events or on the analysis of astronomical images.

While offering advantages, these methods do not seem totally satisfactory.

The use of a radioactive source (see the Web site: HotBits, www.fourmilab.ch/hotbits/)

has been disclosed in the prior art as a source for random numbers by Hotbits, a web based has been disclosed in the prior art as a source for random numbers by Hotbits, a web based source which has stated, in Hotbits: Genuine random numbers, generated by radioactive decay: "People working with computers often sloppily talk about their system's "random number generator" and the "random numbers" it produces. But numbers calculated by a computer through a deterministic process, cannot, by definition, be random. Given knowledge of the algorithm used to create the numbers and its internal state, you can predict all the numbers returned by subsequent calls to the algorithm, whereas with genuinely random numbers, knowledge of one number or an arbitrarily long sequence of numbers is of no use whatsoever in predicting the next number to be generated.

Computer-generated "random" numbers are more properly referred to as pseudorandom numbers, and pseudorandom sequences of such numbers. A variety of clever algorithms have been developed which generate sequences of numbers which pass every statistical test used to distinguish random sequences from those containing some pattern or internal order. A test program is available at this site which applies such tests to sequences of bytes and reports how random they appear to be, and if you run this program on data generated by a high-quality pseudorandom sequence generator, you'll find it generates data that are indistinguishable from a sequence of bytes chosen at random. Indistinguishable, but not genuinely random.

HotBits is an Internet resource that brings genuine random numbers, generated by a process fundamentally governed by the inherent uncertainty in the quantum mechanical laws of nature, directly to your computer in a variety of forms. HotBits are generated by timing successive pairs of radioactive decays detected by a Geiger-Müller tube interfaced to a computer. You order up your serving of HotBits by filling out a request form specifying how many random bytes you want and in which format you'd like them delivered. Your request is relayed to the HotBits server, which flashes the random bytes back to you over the Web. Since the HotBits generation hardware produces data at a modest rate (about 100 bytes per second), requests are filled from an "inventory" of pre-built HotBits. Once the random bytes are delivered to you, they are immediately discarded—the same data will never be sent to any other user and no records are kept of the data at this or any other site. (Of course, if you're using the random data for cryptography or other security-related applications, you can't be certain I'm not squirreling away a copy. But I'm not, really.)

An alternative to downloading HotBits for later use is provided by the randomX package for Java. A program developed with randomX can select from a variety of pseudorandom sequence generators or genuine random data from HotBits, obtained on demand across the Internet".

The electronic noise or pink noise, also known as 1/f noise, is not a valid source of random numbers in so far as the distribution law follows a course 1/f: such distribution law would only favour some numbers than others since it does not have a flat spectrum.

The acoustic and the radio noise are relatively easy to use, but they show safety problems. A malicious device that is located in the same conditions of acoustic or radio noise can play the same sequence of causal numbers. Then, the condition which ensures the absence of "witnesses" to the act generating the random number results missing.

The method that is based on the observation of astronomical events is guaranteed by the absence of witnesses but supposes the use of extremely expensive and complex infrastructures, such as satellites. In this case, in fact, events are recorded on a satellite and subsequently sent on the Earth. Also, in this case, therefore, there is a risk of cyber-attacks because the transmission can be intercepted.

The analysis of astronomical images, in addition to its difficulty, has the problem that "others", starting from the same images, could obtain the same random numbers.

The document WO-A-2004/095199 describes a method for generating random numbers from astronomical events, such as cosmic radiations or solar events. The device described in such document uses a detector of the solar wind, a detector of alpha rays or a detector of gamma rays, and a logic circuit which applies a mathematical rule for generating random numbers.

SUMMARY OF THE INVENTION

The object of the present invention is to propose an apparatus for generating random numbers that operates starting from a phenomenon with a high degree of entropy, and that can be used not only outdoors, but also in closed or underground environments.

According to the first aspect, the present invention relates to an apparatus for generating random numbers as defined by claim 1 and to its preferred embodiments defined by the dependent claims 1-5.

In accordance with a second aspect, the present invention relates to a system for using random numbers defined by claim 6 and to one of its particular embodiments defined by claim 7.

According to a third aspect, the present invention relates to a method for generating random numbers.

BRIEF DESCRIPTION OF THE DRAWINGS

The invention will be described hereinbelow with reference to non-limiting examples, provided for the purposes of explanation, and not limitation in the accompanying drawings. These drawings illustrate different aspects and embodiments of the present invention and, where appropriate, reference numbers illustrating similar structures, components, devices and/or modules in different figures are denoted by similar reference numerals.

DETAILED DESCRIPTION OF THE INVENTION

Figure 1:
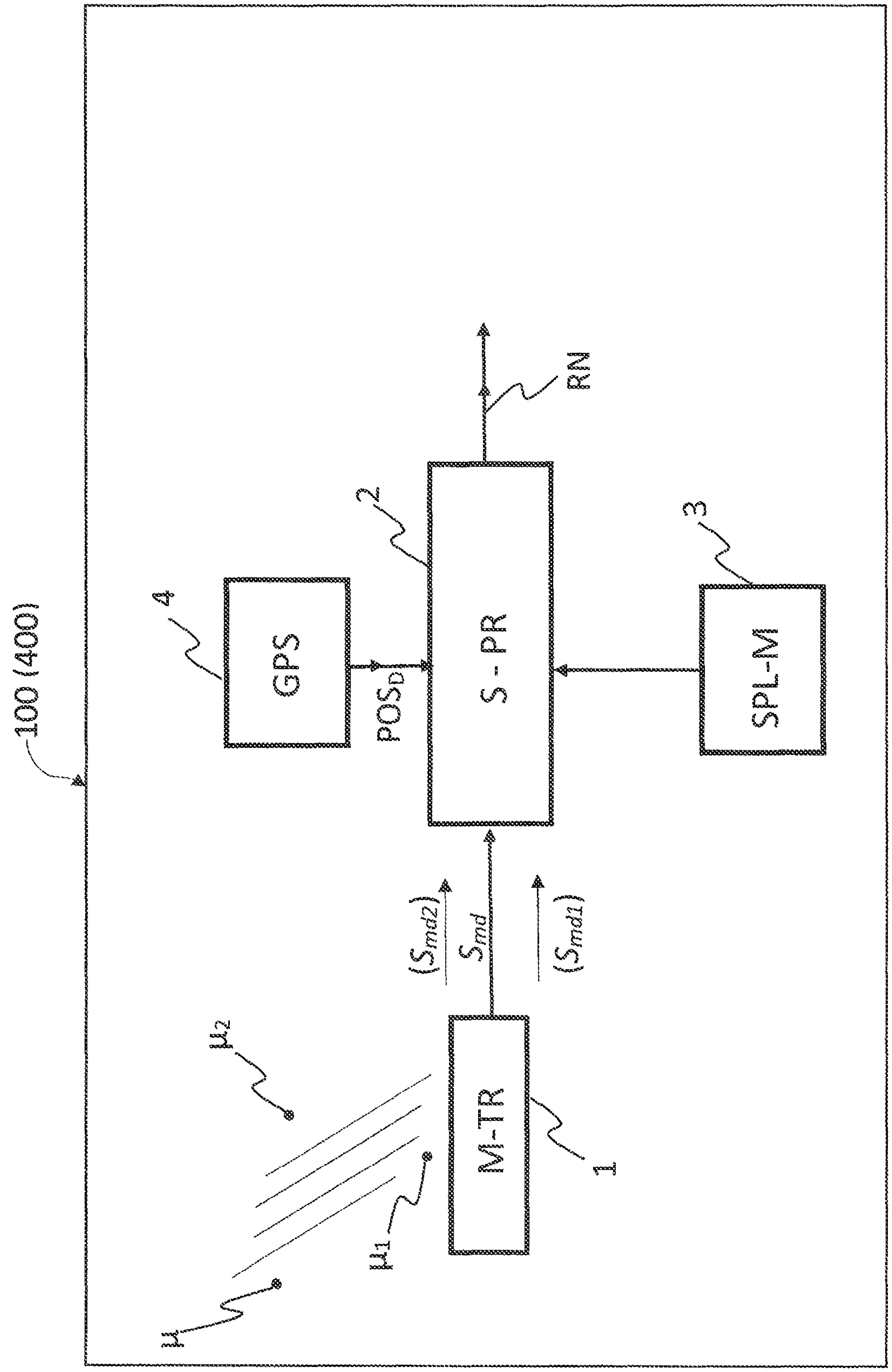
FIG. 1 schematically shows a particular embodiment of an apparatus for generating random numbers.

FIG. 1 shows a particular embodiment of an apparatus for generating random numbers 100 comprising a muon detection device 1 (M-TR) and a processing device 2 (S-PROC) configured to provide random numbers.

The muon detection device 1 is sensitive to the pass-through of muons and is able to provide an electrical detection signal $S_{md}$ associated with the detection of a single muon μ. For example, the electrical detection signal $S_{md}$ represents a parameter associated with the pass-through of a single muon such as, for example the energy deposited by the muon μ in the detector and the instant of time of pass-through (i.e., of detection) of the muon μ.

In particular, the muon detection device 1 is sensitive to muons generated by cosmic rays impinging on the Earth's atmosphere and is capable of operating both on the ground and in altitude, and in open, closed or underground environments.

As known, the muon is a fundamental particle with a negative electric charge and spin ½. The muon has a rest mass of 105.7 MeV/$c^2$, about two hundred seven times the electron mass, and has an average lifespan of 2.2 μs. Most muons reaching the Earth are produced by cosmic rays: the latter, when they penetrate the upper layers of the atmosphere, generate pions, which in turn decay into muons and neutrinos. Thus produced muons move at great speed, so that their average life expectancy observed from the Earth is greater than that observed in a system in which they are at rest, in accordance with the time dilation provided for by the theory of special relativity. Thanks to this phenomenon, a substantial fraction of muons produced in the upper atmosphere reaches the Earth's surface before decaying, and it is thus possible to detect them on the ground.

The muon detection device 1 may be of a known type and can comprise a material sensitive to the pass-through of muons such as, for example an organic or inorganic scintillator, a scintillator crystal, a semiconductor, a superconductor or combinations thereof.

The processing device 2 is configured to receive the electrical detection signal $S_{md}$ and generate a random number RN (in digital format) as a function of a mathematical rule and as a function of the parameter represented by the detection signal $S_{md}$.

The processing device 2 is, for example, a microprocessor or a microcontroller provided with a memory and a processing unit. According to a particular embodiment, the processing device 2 is equipped with a programmable logic (such as, for example a logic FPGA (Field Programmable Gate Array), an ASIC (Application Specific Integrated Circuit) for the processing of the parameter supplied by the detection signal $S_{md}$ according to the corresponding mathematical rule used for generating the random number RN.

The processing device 2 (or the muon detection device 1) can be equipped with an amplifier or an analog-to-digital converter to convert the electrical detection signal $S_{md}$ (if analog) into a digital signal representative of the parameter of interest, namely: a time value of an electrical signal associated with the muon pass-through or by a combination of the two quantities.

It should be noted that the muon detection device 1 and the processing device 2 are conveniently next to one another: for example, they are integrated into a single package and are preferably connected by a wired line 5 that avoids the transmission in open space of the detection signal $S_{md}$.

As exemplified in FIG. 1, the apparatus for generating random numbers 100 is advantageously equipped with a power supply module 3 (SPL-M), such as a rechargeable electrical battery (for example, LiPo, LiFe), an induction module (wireless power transfer technique) or a stabilized power supply. Preferably, the apparatus for generating random numbers 100 is portable.

In the operation, when the muon μ crosses the muon detection device 1, the electrical detection signal $S_{md}$ is generated, representing at least one parameter (instant of time and/or energy released) associated with the muon itself. The processing device 2 receives the electrical detection signal $S_{md}$ and extracts from it a digital value that corresponds to the parameter of interest in order to apply it in the mathematical rule, implemented by a related algorithm, and to obtain the random number RN. Different types of mathematical rules can be used.

Figure 2:
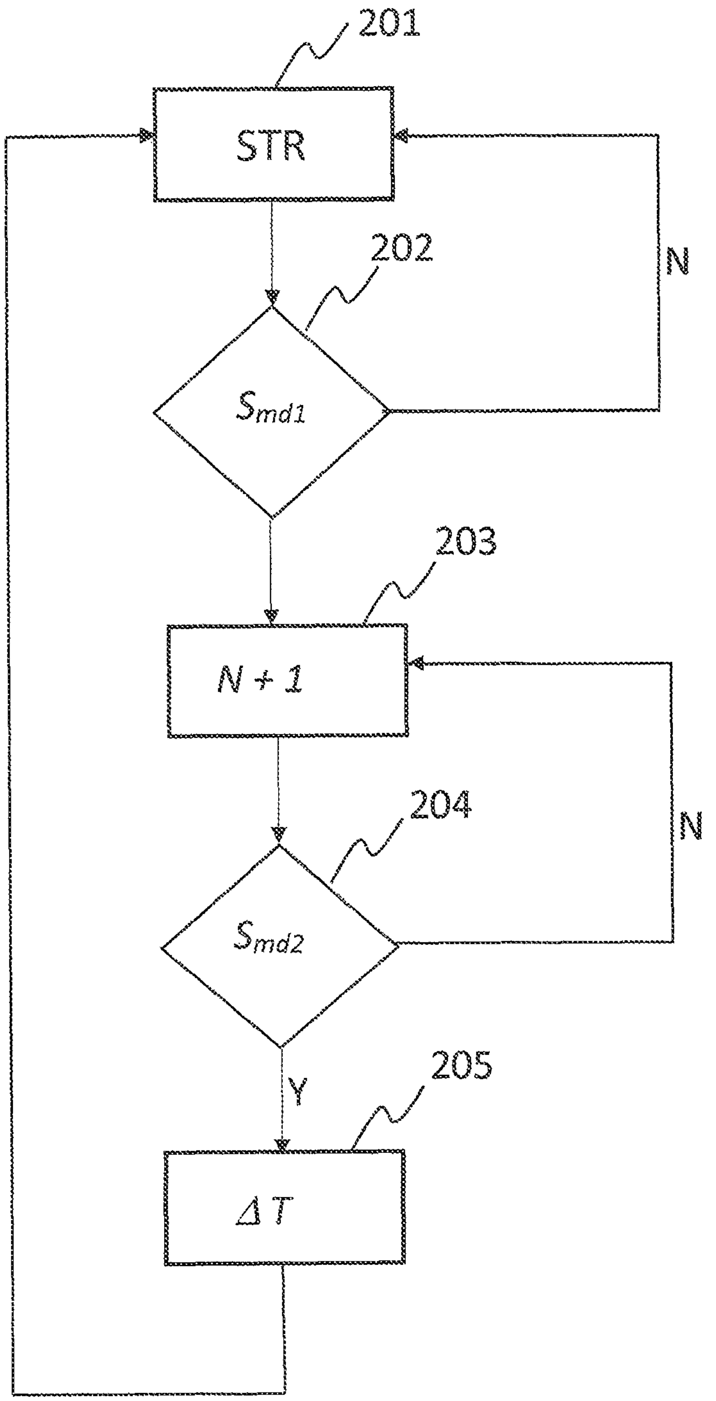
FIG. 2 shows a flow chart regarding a particular operating method of said apparatus of generating random numbers.

FIG. 2 refers to a particular operating method 200 of the apparatus for generating random numbers 100 wherein the mathematical rule applied by the processing device 2 uses the difference between instant of times of detection between the first $\mu_1$ and a second muon $\mu_2$ received by the muon detection device 1 at a time following that of the first muon $\mu_1$. This information is combined, preferably, with that of the energy released by means of an algorithm that can vary from one device to another.

In particular, after a starting step (STR) 201, the method continues towards the first decision step 202 in which the processing device 2 verifies, at a fixed frequency, if the muon detection device 1 has or has not detected the pass-through of a muon. In the negative, the method returns in the starting step 201 (branch). On the other hand, if the processing device 2 recognizes, by means of the first detection signal $S_{md1}$, the actual detection of the first muon $\mu_1$, the method continues (branch Y) with a time increment step 203, wherein a (digital) time counter is incremented by a unit value. This counter value represents the first instant of time T1 of detection of the first muon $\mu_1$, coincidental, in the example, with the counting starting instant of time.

In a second decision step 204, the detection of a second muon $\mu_2$ is verified according to the occurred generation of a second detection signal $S_{md2}$ by the muon detection device 1. In the negative (branch N), the method will return to the time increment step 203, incrementing by one unit the value taken by the time counter. In the positive (branch Y), i.e. when the detection of the second muon $\mu_2$ occurs, the method proceeds towards an exit step 205, wherein a time value T2 indicating the instant of time of detection of the second muon $\mu_2$, stored by the time counter, is output by the counter. The time value T2 counted, as shown above, represents the time interval ΔT ranging between the detection of two subsequent muons.

The so-calculated value ΔT may be used by the mathematical rule used by the processing device 2 to calculate the random number RN. According to a particular example, the same value as the time interval ΔT can represent the random number RN. According to another example, the rule leading to the generation of the random number RN can be based on the time distance between a starting muon and a further muon chosen from a random number generated previously. However, mathematical rules other than those listed above as examples can be used.

It should be noted that, as already mentioned, the mathematical rule adopted by processing device 2 may use, in alternative or in addition to time values, the energy value associated with a muon that is detected. Such energy corresponds to the energy of the muon μ that is released during the pass-through in the muon detection device 1 and is associated with the amplitude of the electrical detection signal $S_{md}$ and to the intensity of the current generated by the muon detection device 1.

The processing device 2 is advantageously equipped with a memory in which the data regarding each single muon detection are recorded, such as for example a detection time value and the energy released by the muon in the detection device 1. The memory (for example, a FIFO, ROM and/or RAM) can also advantageously store the generated random numbers RN.

It should be noted that the flow of atmospheric muons depends on the primary composition of cosmic rays and their angular distribution, the Earth's magnetic field, weather and altitude. All these variables are not known for every muon, and thus the described apparatus guarantees the entropy degree needed to generate pure random numbers.

It should also be noted that, in case of events with a high rate of muons, such as, for example, particle swarms due to high energy primary cosmic rays, the apparatus for generating random numbers 100 is able both to identify such events by controlling the rate of detection signals and ignoring, for example, events too close in time, and to use all the detections recorded in the memory of the processing device 2, measuring the time distance thereof.

According to a particular embodiment, as illustrated in FIG. 1, the apparatus for generating random numbers 100 can be equipped with a satellite tracker 4 that can provide the processing device 2 with the $POS_D$ position taken by the apparatus 100 itself. According to this embodiment, the calculation of the random number RN is based, as well as on muon detection time values and/or the energy released by the muon, also on the information concerning the position $POS_D$ of the apparatus 100. The satellite tracker 4 may be, for example, a GPS tracker.

The apparatus for generating random numbers 100 can be used in various applications such as those in the field of cryptography and generation of pseudo-random numbers, for different possible purposes.

Figure 3:
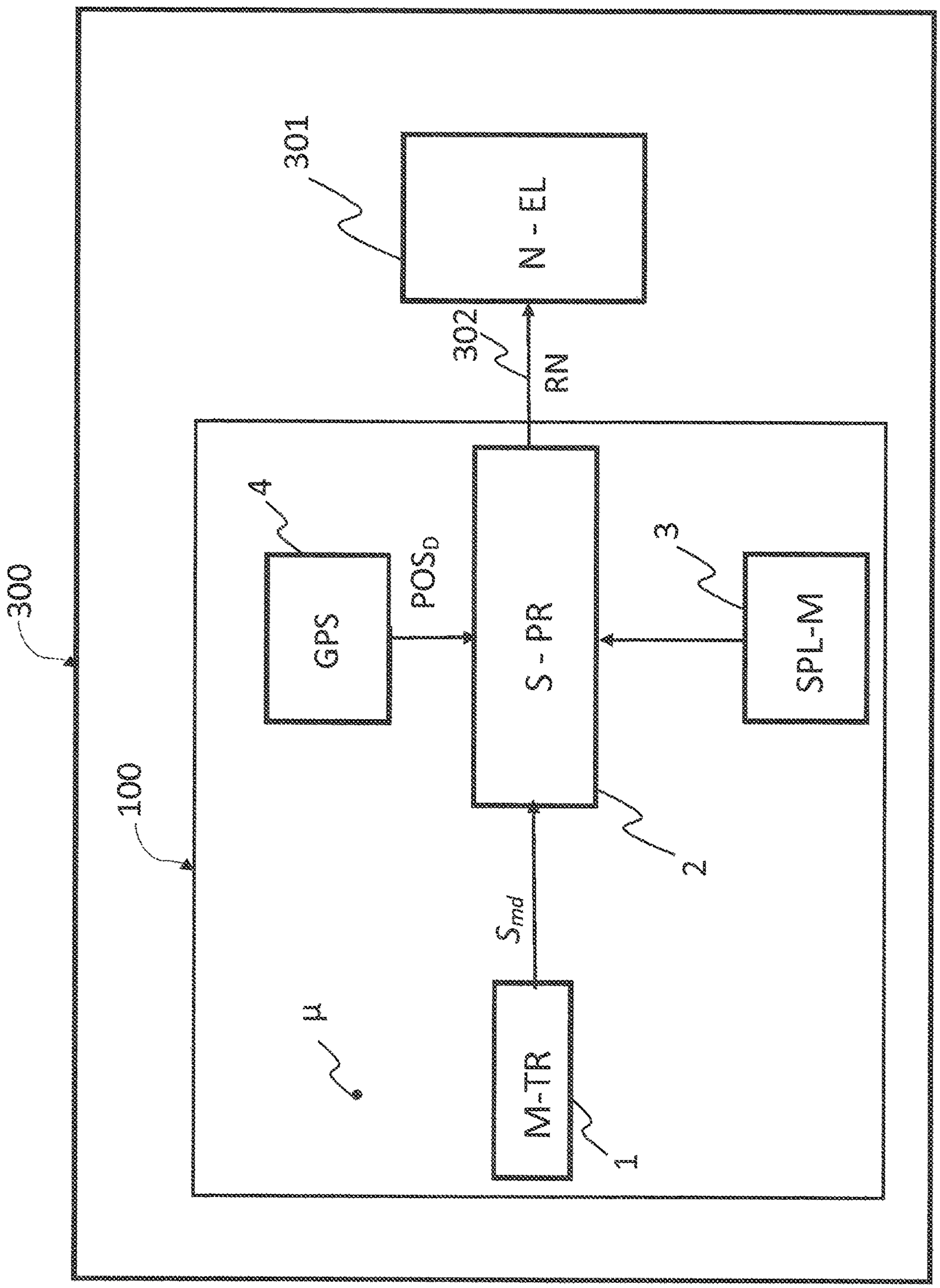
FIG. 3 refers to the first example of a system using random numbers comprising said apparatus for generating random numbers.

For example, FIG. 3 shows a random number application system 300 comprising the apparatus for generating random numbers 100 and a random number processing module 301 (N-EL) such as, for example a cryptographic key generator; a pseudo-random number generator, an electronic key generator for opening devices having a mechanical/digital lock.

The random number processing module 301 (for example, of known type) may be close to the processing device 2, and thus accommodated in the same container wherein the apparatus for generating random numbers 100 is located.

Preferably, the random number processing module 301 is connected to the processing device 2 by means of a wired line 301. According to another example, the random number processing module 301 is integrated into the processing device 2.

According to another embodiment, the random number application system 300 is remote compared to the apparatus for generating random numbers 100 and is connected to the latter by means of a telecommunication system (wired, wireless or mixed).

Figure 4:
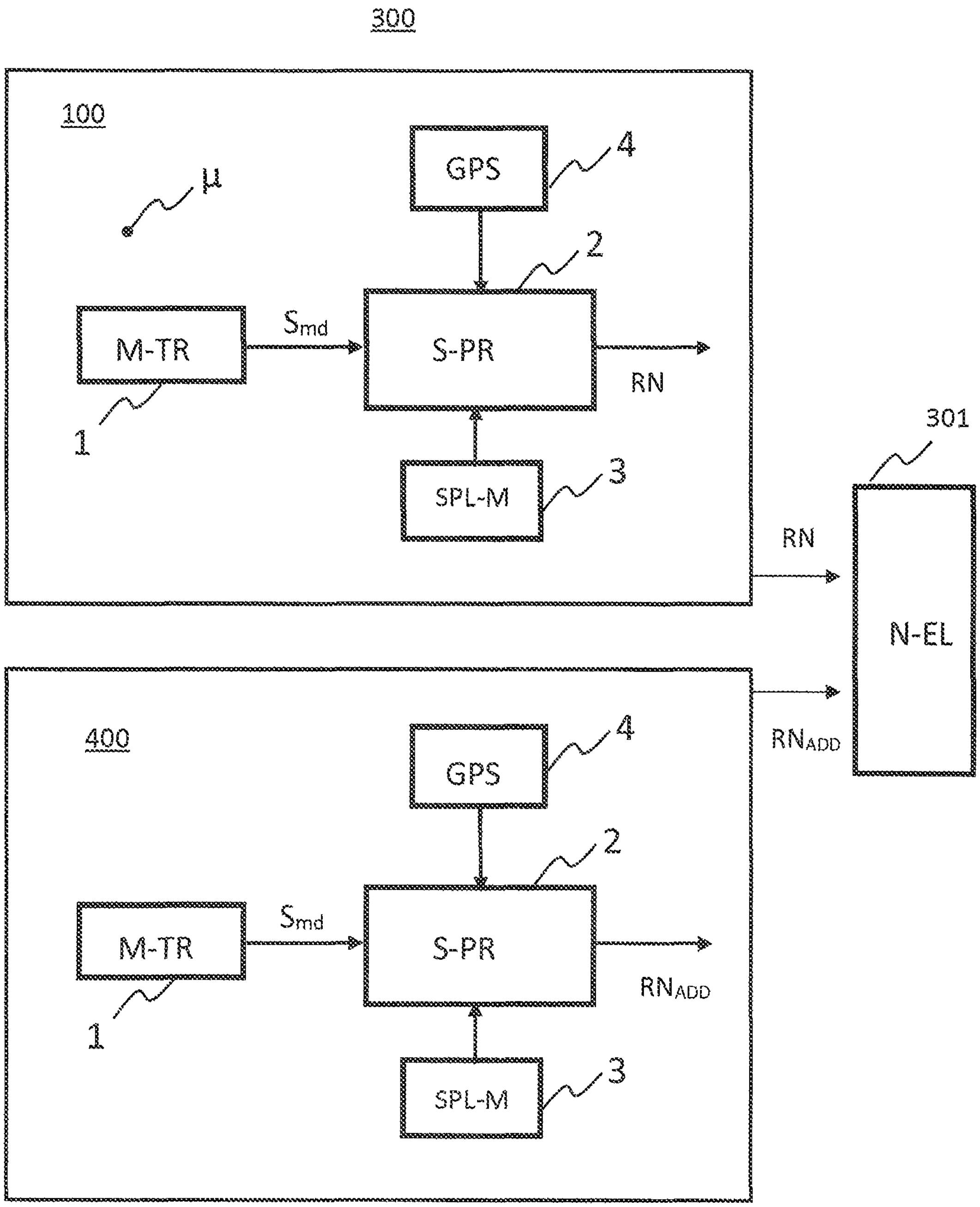
FIG. 4 refers to a second example of the system using random numbers comprising two apparatuses for generating random numbers.

According to a particular embodiment (FIG. 4), the random number application system 300 may include, in addition to the apparatus for generating random numbers 100, a further apparatus for generating random numbers 400 (basically the same as the apparatus 100 of FIG. 1). The satellite module 4 shown in the apparatuses of FIG. 4 is to be understood as optional.

The apparatus for generating random numbers 100 and the further apparatus for generating random numbers 400 are separate devices that, during use, are oriented one towards the another in such a way that the corresponding devices for the detection of random numbers 1 may be crossed (in sequence) by the same muon μ, leading to the generation of relevant, concurrent electrical detection signals $S_{md}$.

In addition, both relative processing devices 2 are configured according to the same mathematical rule, so that the processing device 2 of the further apparatus for generating random numbers 400 generates a further random number $RN_{ADD}$ that results identical to that RN generated by the apparatus for generating random numbers 100, as a result of the passing-through by the same muon.

In operation, it is expected that the random number processing module 301 (similar to that of FIG. 3, integrated in one of the two apparatuses for generating random numbers 100, 400, or external to these) acquires and uses the random number received from one of the two apparatuses 100 or 400 only if it results identical to the random number received by the other apparatus 100 or 400. The system 300, as shown in FIG. 4, forms a kit allowing to carry out a reliability check on the random number provided.

The random number application system 300 of FIG. 4 can be used, for example, in the financial field in which, for example, the apparatus for generating random numbers 100 is a USB port and the apparatus for generating random numbers 400 is integrated into a laptop computer.

The random number application system 300 of FIG. 4 can also be used to generate an opening key for an electronic key device, such as a vault, a database with sensitive data, enabled to recognize the coincident RN code.

The apparatus for generating random numbers 100 may be applied in various fields, such as video games, lotteries, encryption for financial transactions, password generators.

In particular, equipping each device used for lotteries or for online gambling games with the apparatus for generating random numbers 100, the user would be certain that he will not undergo any cyber-scam. Moreover, the apparatus for generating random numbers 100 can be integrated into a device for digital games associated with, like slot machines, roulettes, video poker terminals, etc.

With reference to the financial sector, the use of the apparatus for generating random numbers 100 in the system 300 of FIG. 3 reduces, up to eliminate, the risk of cyber-attacks as it would be possible encrypting confidential information, using the random number RN, to be transmitted to remote locations.

It should be noted that suitably miniaturizing the apparatus for generating random numbers 100, it could be applied also in the field of everyday payments (debit cards, credit cards, etc.).

In addition, the apparatus for generating random numbers 100 suitably miniaturized can be integrated into motherboards for personal computers in order to provide the CPU (Central Processor Unit) with random numbers for applications such as, for example physics, engineering, optics, biology simulations, realistic video games (the behaviour of smart agents based on truly random numbers) and in artistic applications (e.g. electro-acoustic compositions, videos, virtual reality).

The apparatus for generating random numbers 100 described above shows numerous advantages. Actually, thanks to the fact that muons cross large wall thicknesses and also penetrate deeply into the Earth's crust, the described apparatus can be employed in any environment: outdoors, indoors or in an underground environment.

Moreover, the use of the muon detection ensures the necessary randomness of the event to be detected, as well as the absence of possible "witnesses".

It should also be noted that the apparatus for generating random numbers 100, that could also be used on the ground and advantageously realized so as to be portable, does not require a transmission on the Internet (for example, by wireless communication) neither of the detection signal of the muon, nor of the generated random number, thus avoiding that these can be picked up by unauthorized entities.

The invention claimed is:

1. An apparatus for generating random numbers (100), comprising:

a detection device (1) sensitive to the pass-through of muons ($\mu$) and suitable to provide a first detection signal ($S_{md}$) representing at least one parameter associated with the pass-through of a single muon;

a processing device (2) configured to receive the first detection signal ($S_{md}$) and to generate at least one random number (RN) as a function of a mathematical rule and of said at least one parameter characterized in that said at least one parameter associated with the first detection signal ($S_{md1}$) comprises a first instant of time of the pass-through of a first muon ($\mu_1$); the detection device being configured to provide a second detection signal ($S_{md2}$) representing a second instant of time of the pass-through of a second muon ($\mu_2$), delayed with respect to the first muon;

and in that the processing device is configured to determine time difference (AT) between the first and the second instant of time and to generate the at least one random number as a function of the time difference.

2. The apparatus (100) according to claim 1, wherein said at least one parameter comprises at least one of the following values: an instant of time of the pass-through of the single muon; a value representing an energy released by the single muon in the detection device (1).

3. The apparatus (100) according to claim 1, further comprising a satellite module (4) connected with the processing device (2) and configured to provide a position data of said apparatus (100); said mathematical rule being so as to generate the random number also based on said position data.

4. The apparatus (100) according to claim 1, wherein said detection device (1) comprises at least one material sensitive to the pass-through of the muons selected from the group comprising: an organic or inorganic scintillator, a scintillating crystal, a semiconductor material, a superconductor.

5. A random number application system (300) comprising:

an apparatus for generating random numbers (100) configured according to claim 1;

a random number processing module (301) connected to said apparatus for generating random numbers (100) to receive said at least one random number (RN);

characterized in that the system (300) further comprises a further apparatus for generating random numbers (400) comprising:

a further detection device (1) sensitive to the pass-through of muons ($\mu$) and suitable to provide a further detection signal ($S_{md}$) representing a relevant parameter associated with the pass-through of a single muon; the further detection device being orientable so as to be passed through by a same muon that passes through said detection device, and to generate the further detection signal simultaneously with the first detection signal ($S_{md}$);

a further processing device (2) configured to receive the further detection signal ($S_{md}$) and to generate as a function of said mathematical rule, a further random number ($RN_{ADD}$); the random number processing module (301) being configured to compare said at least one random number (RN) with the further random number ($RN_{ADD}$), and to enable the acquisition and the application of the further random number if the latter is identical to said at least one random number.

6. The random number application system (300) according to claim 5, wherein said random number processing module (301) is a device from the group of cryptographic key generators; pseudo-random number generators, electronic key generators for opening devices having mechanical/digital locks.

7. A random number generation method, comprising:

detecting the pass-through of a single muon and generating a first detection signal ($S_{md}$) representing at least one parameter associated with the pass-through of the muon;

processing the first detection signal ($S_{md}$) and generating at least one random number (RN) as a function of a mathematical rule and of said at least one parameter characterized in that the method further comprises providing a first apparatus for generating random numbers (100) comprising a first detection device (1), configured to detect the pass-through of a single muon and to generate the first detection signal ($S_{md}$), and a first processing device (2) to process the first detection signal ($S_{md}$) and to generate the random number (RN) as a function of said mathematical rule and of said at least one parameter;

providing a further apparatus for generating random numbers (400), comprising: a further detection device (1) sensitive to the pass-through of muons ($\mu$) and suitable to provide a further detection signal ($S_{md}$), representing a relevant parameter associated with the pass-through of a single muon, and a further processing device (2) configured to receive the further detection signal ($S_{md}$) and to generate, as a function of said mathematical rule, a further random number ($RN_{ADD}$);

orienting the further detection device (400) so as it is passed through by a same muon passing through said first detection device (1), and generating the further detection signal simultaneously with the first detection signal ($S_{md}$); and providing a random number processing module (301) configured to compare said at least one random number (RN) with the further random number ($RN_{ADD}$) and to enable the acquisition and the application of said further random number if it is identical to said at least one random number.

8. The method according to claim 7, wherein said at least one parameter comprises one of the following values: an instant of time of the pass-through of the single muon; a value representing an energy released by the single muon in the detection device (1).

* * * * *